3,347,256
PRESSURE SURGE SUPPRESSION IN PIPE LINES

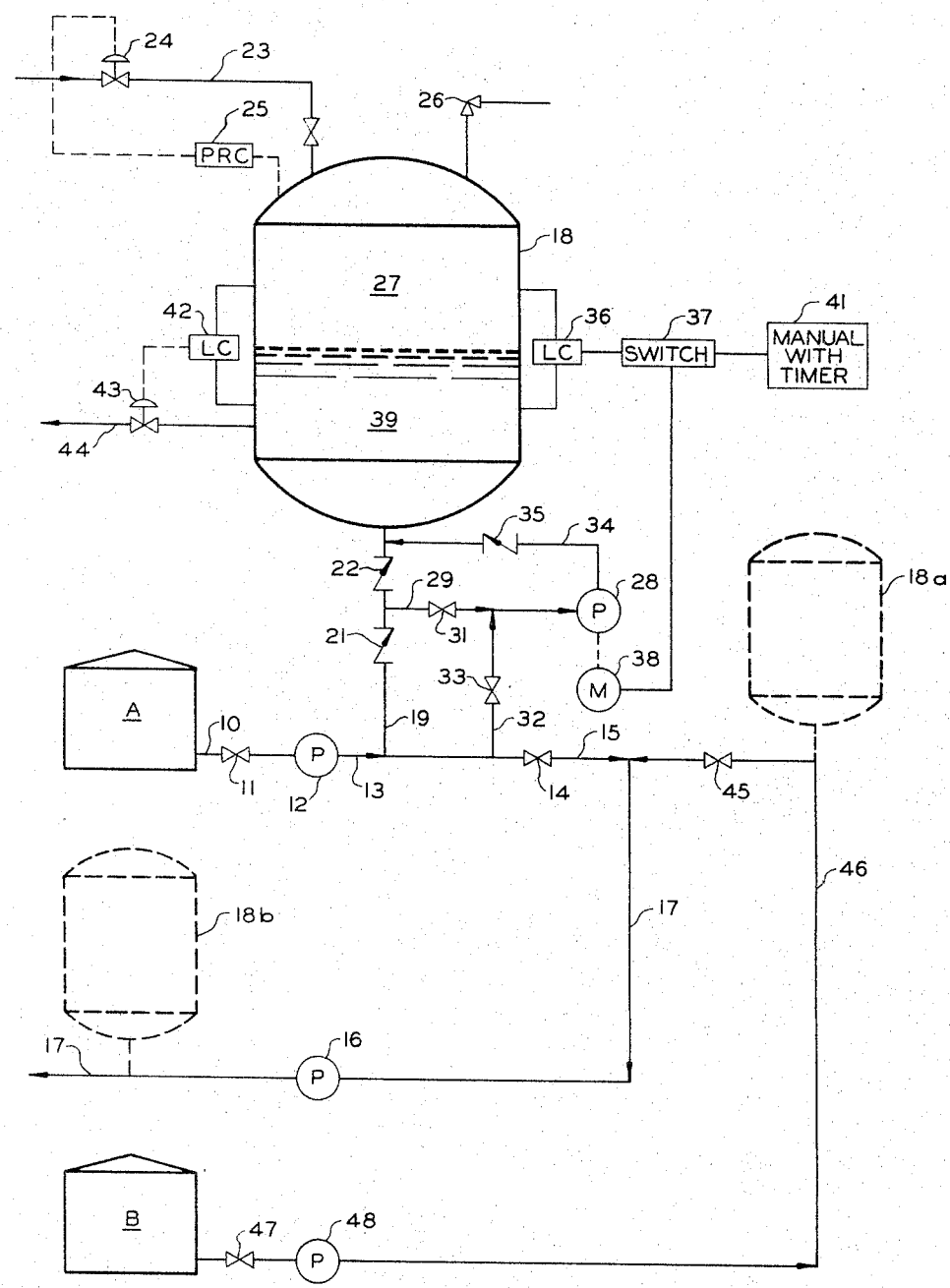

Phillip S. Massey, Thomas A. Matthews II, and Dennis L. Dutcher, Bartlesville, Okla., assignors to Phillips Petroleum Company, a corporation of Delaware
Filed Dec. 21, 1964, Ser. No. 419,785
5 Claims. (Cl. 137—115)

ABSTRACT OF THE DISCLOSURE

In the operation of a liquid-full conduit 18 inches in diameter or larger, surges are suppressed by diverting a sufficient portion of the flowing stream into a liquid-containing surge tank in opposition to a pressurized gas cap to absorb the kinetic energy of the flowing stream.

---

This invention relates to suppression of pressure surges in pipe lines, particularly large pipe lines. In one aspect this invention relates to a method and means for absorbing the surge pressure in excess of the safe operating pressure of equipment associated with the pipe line when a surge occurs. In another aspect the invention relates to a method and means for utilizing a surge tank in a large diameter pipe line system wherein different products are passed through the pipe line in sequence.

Increased demand for petroleum products throughout the United States has resulted in ever increasing quantities of refined petroleum products being shipped to the Eastern states from the oil producing Mid-Continent States. Large diameter pipe lines have been found to be the most economical method for shipping refined products from the Midwestern and Southwestern parts of the United States to the heavily populated Eastern States. Successful operation of the 18-inch (Little Inch) and 24-inch (Big Inch) diameter pipe line systems has recently been followed by installation and operation of a 36-inch diameter pipe line that extends over a thousand miles across the United States.

These large diameter products pipe line systems are subject to the same problems encountered by smaller diameter crude oil, water and gas pipe lines but are also subject to problems that result from their large diameters. The problems that are considered here are those arising from pressure surges that occur in the liquid-filled pipe line as a result of a change in liquid velocity. A change in velocity can be caused by pump failure, air or voids in the normally liquid-filled pipe line, or unintentional closure of a valve.

The 36-inch refined products pipe line transports the products of a number of suppliers and surges have occurred or have been created in the act of switching the feed to the pipe line from one supplier to another. Timed valve operation has alleviated this problem considerably but unintentional closure of valves and downstream pump failures have occurred with resultant damage to the supplier's pump upstream from the source of the surge.

It is therefore an object of this invention to provide a method and means for absorbing surge pressure in a large diameter pipe line in excess of the pressure tolerated by the pipe line and equipment associated with the pipe line. It is also an object of this invention to provide a method and means for operating a surge tank in a refined products pipe line system so as to avoid contamination of products by the liquid in the surge tank. A further object of this invention is to provide a method and means for suppressing surge pressure in a large diameter refined products pipe line without introducing gas or contaminating liquid into the pipe line. Other objects and advantages of the invention will be apparent to one skilled in the art upon studying the disclosure of the invention including the detailed description and the drawing wherein:

The sole figure of the drawing is a schematic illustration of a preferred embodiment of the apparatus of the invention.

Referring now to the drawing, a 36-inch refined petroleum products pipe line surge absorption will be described. Supplier A pumps liquid product from tank A via 36-inch diameter conduit 10, 36-inch valve 11, pump 12, 36-inch diameter conduit 13, 36-inch valve 14 and 36-inch diameter conduit 15 to the inlet of pump 16 in the 36-inch diameter products pipe line system. Pump 16 boosts the flow of liquid products through the 36-inch diameter pipe line 17.

The surge pressure suppression or surge pressure absorption system for protection of conduit 13 and pump 12 comprises 1000 cubic feet capacity surge tank 18 connected to conduit 13 by a 10-foot length of 36-inch diameter conduit 19 containing check valves 21 and 22. An inert gas such as nitrogen is introduced via conduit 23 and motor valve 24 to the top portion of surge tank 18. A positive pressure is maintained in tank 18 by pressure controller 25 which is set at or slightly above the "shut-in" pump pressure in conduit 13 when valve 14 is closed and pump 12 is attempting to pump liquid through conduit 13. Pressure relief valve 26 is set at 100 p.s.i. or slightly below to vent gas from tank 18 in case the pressure of the gas cap 27 in surge tank 18 rises to that value.

Pump 28 draws liquid from between valves 21 and 22 via conduit 29 containing valve 31 and/or from conduit 13 via conduit 32 containing valve 33 and pumps the liquid via conduit 34 containing check valve 35 to conduit 19 downstream from the check valve 21 and 22.

Liquid level controller 36 operates switch 37 to start motor 38 so as to pump liquid into the bottom of surge tank 18 when the level of liquid 39 drops to a selected level. Motor 38 can also be activated manually by means of timer 41.

Liquid level controller 42 opens motor valve 43 to discharge liquid from surge tank 18 via conduit 44 when the level of liquid 39 rises to a selected level above the level set point of controller 36.

When supplier A has passed an allotted quantity of liquid product to pipe line 17, valve 14 is closed, valve 45 is simultaneously opened and supplier B pumps liquid product from tank B via conduit 46 containing valve 47 and pump 48 to the inlet of pump 16 via conduit 17. Supplier B can advantageously utilize a surge tank 18a and its associated equipment for protection of his pump 48 and other equipment. A similarly equipped surge tank 18b can also be installed by the pipe line operator downstream from pump 16.

Conventional surge suppressing methods and devices have not proven satisfactory because of lag in response to a surge or because of contamination of product by leakage into the pipe line. Efforts to overcome these difficulties have heretofore failed.

We have now discovered a method for solving the problem of pressure surge suppression in large diameter (18-inch diameter and larger) conduits flowing liquid full at high liquid velocity; and a combination of elements for practicing such method. Broadly, our invention contemplates diverting a sufficient portion of the flowing stream into a liquid-containing surge tank in opposition to a pressurized gas cap to absorb the kinetic energy of the flowing stream. Further in accordance with our invention we employ a plurality of check valves in the conduit leading to the surge tank and pump liquid from between the check valves into the surge tank to maintain a predetermined liquid level therein. Furthermore, when a product is passed through the conduit that differs from the liquid in the surge tank, we pump liquid from the conduit into the surge tank and discharge liquid from the surge tank so that after a short time the liquid in the connecting conduit is substantially the same as that in the main conduit. If liquid then leaks through the check valves, it does not contaminate the liquid in the conduit.

We have found that there are certain requirements that are critical in suppressing surge pressure waves in large diameter (18-inch and larger) conduits and these requirements are not predictable from the requirements for surge suppression in smaller diameter conduits. For example, the capacity of the surge tank is not critical for absorbing the initial surge pressure peak (shock wave) but is critical for absorbing the total kinetic energy of the moving stream.

Where there is an instantaneous or substantially instantaneous change in the velocity of a liquid flowing at high velocity, e.g., about 10 feet per second, through a conduit, there is generated a shock wave that travels through the liquid at the sonic velocity thereof. This is a relatively low energy wave which is followed by a pressure surge (wave) that will contain all of the kinetic energy of the flowing stream. This second wave expands the conduit by the conversion of kinetic energy to potential energy causing a high pressure to exist for some duration of time. This latter effect is capable of conduit and/or pump housing rupture.

A pressurized gas cap surge tank can absorb the excess of the initial shock wave over a selected maximum pressure, e.g., 100 p.s.i., but may fail to maintain the final pressure below 100 p.s.i. This failure is caused by insufficient capacity of the surge tank to transform the kinetic energy of the flowing liquid to potential energy in the compressed gas cap after the liquid velocity of the flowing stream is instantaneously changed. Where the pumping pressure on the conduit is about 50 p.s.i., the pressure on the conduit at the closed valve can quickly rise to 200 to 300 p.s.i. If the flowing stream is decelerated at a rate low enough to prevent the surge pressure from being destructive, a certain volume of liquid must be removed from the conduit; the surge tank must have sufficient capacity to store this amount of liquid.

The following Example I illustrates one method for calculating the required surge tank capacity of a 36-inch diameter conduit 1200 feet in length between the pump and the valve which is closed.

*Example I*

Kinetic energy of the moving stream at the instant the valve is closed dead-ending the line is calculated from:

$$K.E. = \frac{MV^2}{2g}$$
$$= \frac{LA\rho V^2}{2g}$$

where:

$M$=pounds mass, $lb_m$
$V$=velocity, ft./sec.
$L$=length of line, feet
$A$=cross-sectional area, ft.$^2$
$g$=gravitational constant, $$32.2 \frac{lb_m \text{ ft.}}{lb_f \text{ sec.}^2}$$

$\rho$=density of fluid, $lb_m/ft.^3$
$lb_f$=pounds force for delivery line:

$L$=1200 ft.
$A$=7.1 ft.$^2$
$\rho$=54 $lb_m/ft.^3$
$V$=10.8 ft./sec.

K.E.=840,000 foot pounds, ft. $lbs_f$

Initial surge tank pressure is to be 50 p.s.i. Final surge tank pressure is to be 86 p.s.i. To find a volume sufficient to absorb the 840,000 ft. $lbs_f$ of kinetic energy by increasing the pressure in the surge tank from 50 to 86 p.s.i., assume that the cross-sectional area of the surge tank is 100 ft.$^2$; then the average pressure being applied to the area as the pressure is increased is:

$$\frac{50+86}{2} = 68 \text{ p.s.i.}$$

Since the pump shut-in-head is 50 p.s.i., the pressure being applied to decelerate the moving liquid column is 68−50 or 18 p.s.i. average The force (pressure×area) is then, where P=pressure p.s.i. and $A$=area, ft.$^2$:

$$PA = \frac{18 \text{ } lbs_f}{\text{in.}^2} \times \frac{144 \text{ in.}^2}{\text{ft.}^2} \times 100 \text{ ft.}^2 = 2.60 \times 10^5 \text{ } lbs_f$$

Work=$PAX$ where X is the distance in feet through which the force is moved;
∴$PAX$=840,000 ft. $lbs_f$=8.4×10$^5$ ft. $lbs_f$
so that $$X = \frac{8.4 \times 10^5}{2.60 \times 10^5} = 3.25 \text{ ft}$$

Since the assumed cross-sectional area of the tank was 100 ft.$^2$ and the distance the force moved was 3.25 ft., the volume of liquid entering the tank was 325 ft.$^3$; therefore, if $V_1$ was the initial gas cap volume, $V_1$−325 is the final volume occupied by the gas.

Since:

$P_1V_1 = P_2V_2$ (Isothermal process)
$(50+14.7)V_1 = (86+14.7)(V_1-325)$
∴$V_1$=915 ft.$^3$, so use at least a 1000 ft.$^3$ tank to provide at least 85 ft.$^3$ for liquid seal at bottom of tank.

We have also found that the conduit connecting the surge tank to the delivery line or pipe line should be at least about as large as the pipe line and should be as short as possible. In any event the connecting conduit should not be more than 3 to 4 conduit diameters in length.

The surge tank should be located upstream from any valve that can be closed to cause a surge, and should be located as close to that valve as is practical.

In the following Example II the effects of varying surge tank and connecting conduit sizes are shown.

*Example II*

The data in the following table, determined by analog simulation, apply to a 36-inch delivery conduit or pipe line operated at 50 p.s.i. and a liquid velocity of about 10 feet per second. The surge pressure results from closure of a valve downstream from the pump and surge tank. Initial surge tank pressure is 50 p.s.i.

TABLE I

| Case No. | Surge Tank Size, ft.³ | Connecting Line Size | | Initial Peak Pump Pressure, p.s.i. | Maximum Pump Pressure, p.s.i. | Final Surge Tank Pressure, p.s.i. |
|---|---|---|---|---|---|---|
| | | Diameter, in. | Length, ft. | | | |
| 1 | 1,000 | 36 | 10 | 91 | 91 | 77 |
| 2 | 500 | 36 | 10 | 91 | 100 | 105 |
| 3 | 1,000 | 24 | 10 | 147 | 147 | 77 |
| 4 | 1,000 | 36 | 15 | 105 | 105 | 77 |

The results in Table I illustrate the requirements for maintaining surge pressure on the pump and tank below 100 p.s.i. The results of Table I have been verified by actual experience in the field where several severe surges have been successfully suppressed. No contamination of products being pumped through the conduit has occurred even though the surges have occurred over a period of time during which different materials were being pumped through the conduit.

That which is claimed is:

1. Apparatus for absorbing surge pressure in excess of about 100 p.s.i. resulting from a substantially instantaneous change in velocity of liquid being pumped through a valved 36-inch dimeter pipe line at 25 to 50 p.s.i. which comprises,
   (1) a surge tank having a volume of about 1000 cubic feet located adjacent a pipe line valve downstream from said tank;
   (2) a relief valve connected to an outlet in the upper portion of said surge tank to relieve gas pressure in excess of about 100 p.s.i.;
   (3) means to supply gas to an inlet in the upper portion of said surge tank at about pipe line pressure to about 5 p.s.i. above pipe line pressure;
   (4) a 36-inch diameter first conduit not more than about 10 feet in length connecting said 36-inch diameter pipe line to the lower portion of said surge tank;
   (5) at least two check valves in said conduit to prevent liquid passing from said surge tank to said pipe line;
   (6) a pump;
   (7) a second conduit connected to said pipe line, to said first conduit between said check valves and to the inlet of said pump;
   (8) a third conduit connecting the outlet of said pump to said first conduit downstream from said check valves;
   (9) a check valve in said third conduit to prevent flow of liquid downstream from said check valves to the outlet of said pump;
   (10) a first liquid level controller operatively connected to said surge tank and to said pump to pump liquid from said pipe line and from between said check valves into said third conduit downstream from said check valves when the liquid in the surge tank drops to a preselected level;
   (11) a fourth conduit connected to an outlet in the lower portion of said surge tank;
   (12) a valve in said fourth conduit; and
   (13) a second liquid level controller operatively connected to said surge tank and to said valve in said fourth conduit to dump liquid from said surge tank when the liquid rises to a preselected level.

2. Apparatus for absorbing surge pressure in excess of a selected maximum pressure resulting from stoppage of flow of liquid being pumped by a pump through a first conduit which comprises:
   (1) a surge tank, having a capacity in excess of the volume resulting from a surge, located downstream from said pump and having its lower portion connected to said first conduit by a second conduit having at least about the same diameter as the first conduit and being not more than about 3 to 4 conduit diameters in length;
   (2) means to supply an inert gas to the upper portion of said surge tank at a pressure about equal to the pressure in the first conduit;
   (3) means to relieve pressure in the upper portion of said surge tank in excess of the selected maximum pressure;
   (4) a plurality of check valves positioned in said second conduit to prevent passage of liquid from said surge tank to said first conduit;
   (5) means to pass liquid from a liquid source to said surge tank in an amount sufficient to maintain a selected minimum liquid level in said surge tank; and
   (6) means to discharge liquid from said surge tank in excess of a selected maximum liquid level.

3. Apparatus for absorbing surge pressure in excess of a selected maximum pressure resulting from stoppage of flow of liquid being pumped by a pump through a first conduit which comprises:
   (1) a surge tank, having a capacity in excess of the volume resulting from a surge, located downstream from said pump and having its lower portion connected to said first conduit by a second conduit having at least about the same diameter as the first conduit and being not more than about 3 to 4 conduit diameters in length;
   (2) means to supply an inert gas to the upper portion of said surge tank at a pressure about equal to the pressure in the first conduit;
   (3) means to relieve pressure in the upper portion of said surge tank in excess of the selected maximum pressure;
   (4) a plurality of check valves positioned in said second conduit to prevent passage of liquid from said surge tank to said first conduit;
   (5) means to pass liquid from said first conduit to said surge tank in an amount sufficient to maintain a selected minimum liquid level in said surge tank; and
   (6) means to discharge liquid from said surge tank in excess of a selected maximum liquid level.

4. Apparatus for absorbing surge pressure in excess of a selected maximum pressure resulting from stoppage of liquid being pumped by a pump through a first conduit comprising:
   (1) a surge tank, having a capacity in excess of the volume resulting from a surge, located downstream from the pump and having its lower portion connected to said first conduit by a second conduit having at least about the same diameter as the first conduit and not more than about 3 to 4 conduit diameters in length;
   (2) means to supply an inert gas to the upper portion of said surge tank at a pressure about equal to the pressure in the first conduit;
   (3) means to relieve pressure in the upper portion of said surge tank in excess of the selected maximum pressure;
   (4) a plurality of check valves positioned in said second conduit to prevent passage of liquid from said surge tank to said first conduit;

(5) means to pass liquid from between said check valves to said surge tank in an amount sufficient to maintain a preselected minimum liquid level in said surge tank; and (6) means to discharge liquid from said surge tank in excess of a preselected maximum liquid level.

5. Apparatus for absorbing surge pressure resulting from sudden stoppage of the flow of liquid through a first conduit so as to prevent damage to equipment associated with said first conduit which comprises, a surge tank, the lower portion of which contains liquid and the upper portion of which contains a gas maintained at a pressure greater than the pressure of the liquid flowing in said first conduit and less than damaging pressure to equipment associated with said first conduit; a second conduit connecting said first conduit to said surge tank at a point below the liquid level in said surge tank; at least two check valves in said second conduit to allow liquid to flow from said first conduit into said surge tank; means to supply gas to said surge tank at a pressure above the pressure of the liquid flowing in said first conduit and below the damaging pressure to equipment associated with said first conduit; means to pump a stream of liquid from said first conduit and from said second conduit, between said check valves, into said surge tank; and means to withdraw liquid from said surge tank when the liquid rises to a selected level.

References Cited

FOREIGN PATENTS 908,435   10/1962   Great Britain.

STANLEY N. GILREATH, *Primary Examiner.*